(12) United States Patent
Hori

(10) Patent No.: US 6,485,201 B2
(45) Date of Patent: Nov. 26, 2002

(54) FILM BACK EXCHANGEABLE CAMERA

(75) Inventor: Masakatsu Hori, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/749,557

(22) Filed: Dec. 28, 2000

(65) Prior Publication Data

US 2001/0007613 A1 Jul. 12, 2001

(30) Foreign Application Priority Data

Jan. 11, 2000 (JP) .................... P2000-002133

(51) Int. Cl.⁷ .......................... G03B 17/26; G03B 17/00
(52) U.S. Cl. ...................... 396/511; 396/414; 396/297; 396/540
(58) Field of Search .................. 396/387, 388, 396/390, 511, 513, 517, 518, 524, 535, 437, 263, 512, 355, 373, 414, 48, 5, 297, 540

(56) References Cited

U.S. PATENT DOCUMENTS 2,911,894 A * 11/1959 Hennig et al. .............. 396/353
6,311,022 B2 * 10/2001 Hori .......................... 396/266

OTHER PUBLICATIONS

U.S. patent application No. 09/757,463 to Hori filed on Jan. 11, 2001 and entitled "Film Back Exchangeable Camera and Exchangeable File Back".*

* cited by examiner

Primary Examiner—Russell Adams
Assistant Examiner—Andrew Sever
(74) Attorney, Agent, or Firm—Greenblum & Bernstein, P.L.C.

(57) ABSTRACT

A film back exchangeable camera is provided. The film back exchangeable camera has a camera body and a film back that can be attached to a rear portion of the camera body. The film back exchangeable camera includes a backward protrusion protruding backward from a film back attaching surface and covering a top surface of the film back. The camera also includes at least one operation member provided on the backward protrusion and a grip portion protruding backward from the film back attaching surface and covering one side surface of the film back.

12 Claims, 2 Drawing Sheets

FILM BACK EXCHANGEABLE CAMERA

BACKGROUND OF THE INVENTION

The present invention relates to a film back exchangeable camera in which a film back can be attached to and detached from a camera body.

FIG. 3 shows one example of a related film back exchangeable camera. The camera shown in the figure is a film back exchangeable camera 110 of the single-lens reflex type. A box-shaped filmback 130 can be attached to and detached from a rear portion of a camera body 120. A photographing lens 140 is attached to a front portion of the camera body 120. The camera body 120 has a grip portion 121 on the right hand side as viewed from a photographer, and a finder block 124 is supported on the substantially central portion of the top surface of the camera body 120. This film back exchangeable camera 110 suffers from a problem in that the presence of the exchangeable film back 130 limits a space where one or more operation member(s) can be arranged, in particular, on the top surface of the camera. Therefore, it is difficult to arrange the operation member(s) while the good operation ability is being secured.

For example, it is preferable from viewpoint of the operating ability that operation dials for exposure compensation and for shutter speed setting are provided near a photographer. However, in the film back exchangeable camera 110 shown in FIG. 3, the film back 130 is located between the photographer and the camera body 120. Though an ISO dial 134 for setting film sensibility is provided on the top surface of the film back 130, the operation members such as the dials for shutter speed setting and for exposure compensation cannot be provided on, or are difficult to be provided on the film back side due to their function. Though the finder block 124 in the camera body 120 is protruded in the vicinity of the photographer, it is difficult to provide the operation members on the outer surface of the finder block since finder optical system, light receiving elements and the like occupy the interior of the finder block 124 and since the finder block may be designed to be exchangeable. Accordingly, in the camera 110 shown in FIG. 3, the space where the operation members can be arranged is substantively limited only to the top surface of the camera body 120 on the left hand side of the finder block 124 and the top surface of the grip portion 121. In the camera shown in FIG. 3, an exposure compensating operation dial 127 and a shutter speed setting operation dial 128 are provided in these sites, but the access by the photographer to these dials for operation is unsatisfactory. This problem that the installation or arrangement space is limited by the presence of the film back 130 is also applied to other operation members than the dials for exposure compensation and for shutter speed setting.

SUMMARY OF THE INVENTION

The invention has been made in view of the above problem, and an object of the present invention is to obtain a film back exchangeable camera that is superior in operation ability with a simple structure.

According to the present invention, the camera body is provided with a backward protrusion on which at least one operation member can be arranged.

As a preferred embodiment, the present invention provides a camera having a camera body and a film back that can be attached to and detached from a rear portion of the camera body. A backward protrusion which protrudes backward from a film back attaching surface and covers a top surface of the film back is provided to the camera body. At least one operation member is arranged on the backward protrusion. According to this construction, regardless of the presence of the film back, the operation member for the camera can be readily arranged at a position enabling smooth and easy operation.

It is preferable that the backward protrusion is formed in a shape of a flat plate. Further, a finder block can be placed on the backward protrusion.

The at least one operation member arranged on the backward protrusion may be, for example, an exposure compensating dial and/or a shutter speed setting dial. In this case, it is preferable that the dials are located opposite from each other with respect to the finder block.

In the above film back exchangeable camera, it is further preferable that the camera body has a grip portion that protrudes backward from the film back attaching surface together with the backward protrusion and that covers one side surface of the film back.

The present disclosure relates to the subject matter contained in Japanese patent application No. 2000-2133 (filed on Jan. 11, 2000), which is expressly incorporated herein by reference in its entirety.

DESCRIPTION OF THE PREFERRED EMBODIMENT

Figure 1:
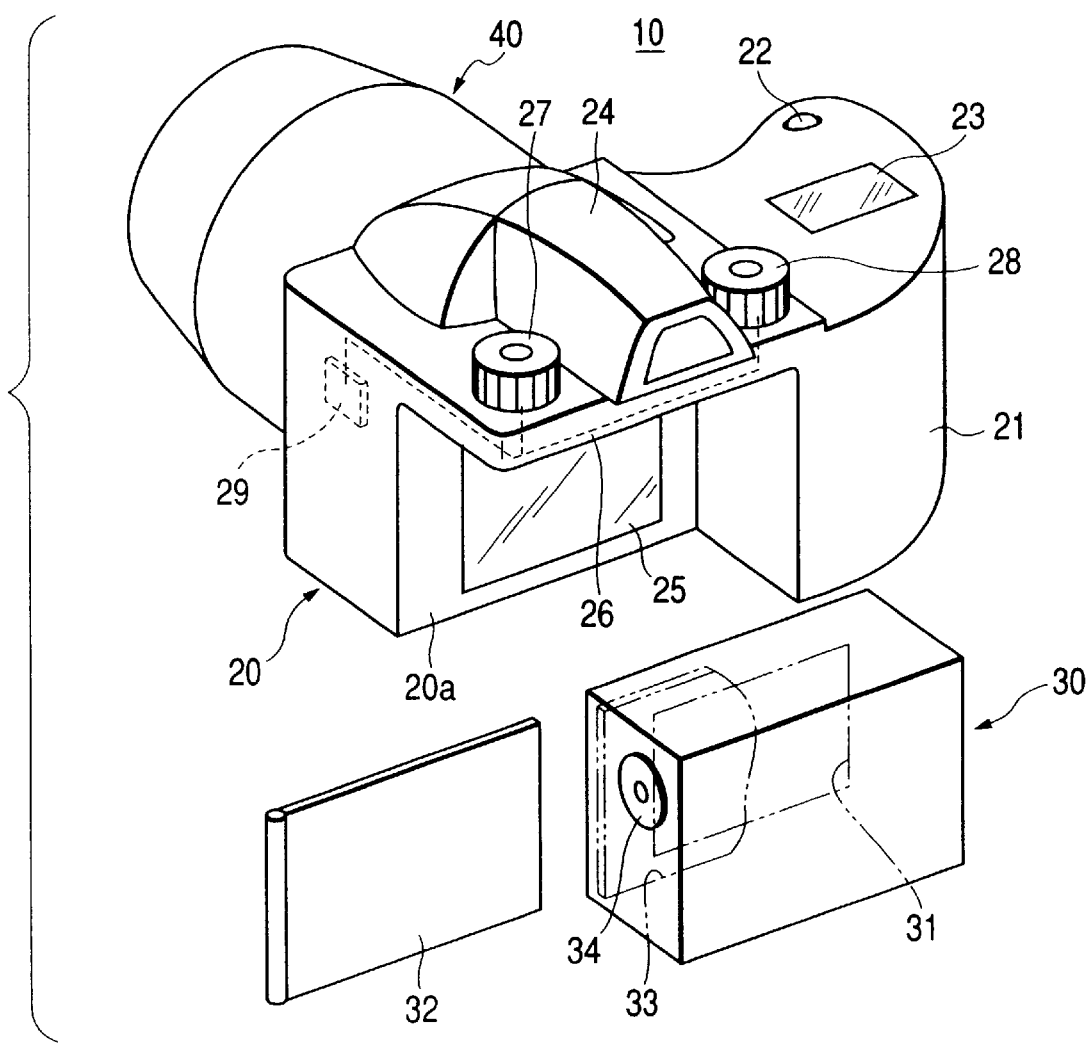
FIG. 1 is an external perspective view showing a film back exchangeable camera according to an embodiment of the invention, in a state that a film back is separated from a camera body.

FIG. 1 shows a state in which a film back exchangeable camera 10 according to an embodiment of the invention is divided into a camera body 20 and a film back 30. In a front portion of the camera body 20, a photographing lens 40 is provided. The photographing lens 40 may be an exchanging lens that is detachably attached with respect to the camera body or may be fixed to the camera body 20.

The camera body 20 has a grip portion 21 that is located on the right side of the camera lens 40, and that is to be held by a photographer. A battery chamber (not shown) is defined within the grip portion 21. A release button 22 and a liquid crystal display 23 on a top surface of the grip portion 21. Further, a finder block 24 is provided on a substantially central portion of a top surface of the camera body 20, which incorporates therein a finder optical system and a photometric light receiving element. The finder block 24 may be fixed to the camera body 20 or may be detachably attached thereto. As described in connection with the related art, it is difficult to provide an operation member on the outer surface of the finder block of this kind.

A film back attaching surface 20a is formed on the rear portion of the camera body 20, and a focal-plane shutter 25 is provided to be confronted with the film back attaching surface 20a. The focal-plane shutter 25 opens for a predetermined time upon a pushing operation of the release button 22, and causes the light flux entering from the photographing lens 40 to the film back 30 side.

The film back 30 is attached to the film back attaching surface 20a of the camera body 20 in a state where an aperture 31 is confronted with the focal-plane shutter 25. Since a mechanism for attaching the film back 30 to the camera body 20 is known, the detailed description therefore is omitted. The attaching mechanism locks the film back 30 to the film back attaching surface 20a in a state where the film back 30 is tightly contacted with the surface 20a (see FIG. 2), and a film (not shown) accommodated in the film back 30 can be exposed to light by opening the focal-plane shutter 25. Further, a slit 33 into which a shading plate 32 can be inserted is formed in the film back 30. When the shading plate 32 is inserted into the slit 33, the light flux is prevented from entering inward from the aperture 31, and thus the film is not exposed to the light. After the film back 30 has been attached to the camera body 20, the shading plate 32 is pulled out from the slit 33. The camera body 20 and/or the film back 30 is so designed that the light does not come through the slit 33 into the film back 30.

Figure 2:
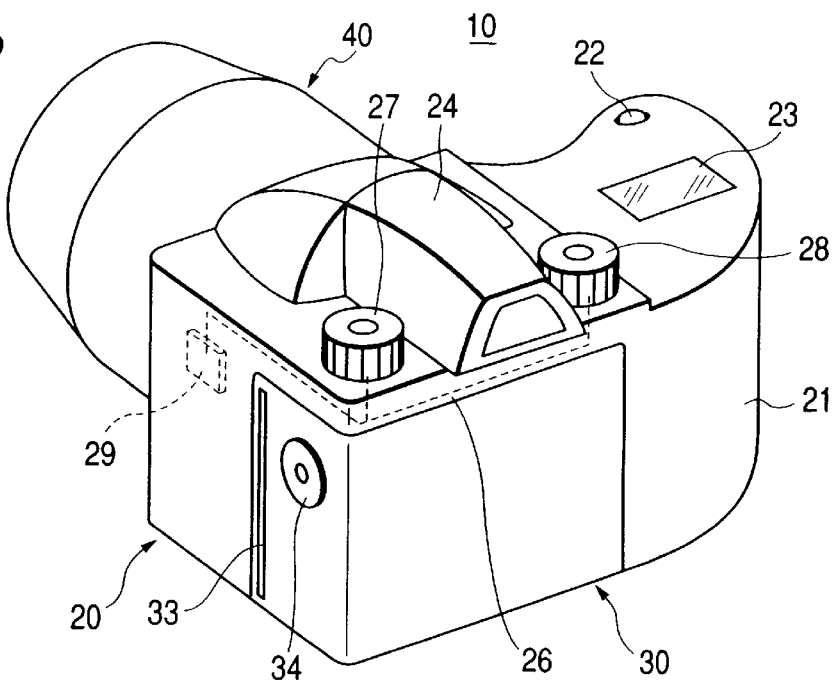
FIG. 2 is an external perspective view showing the camera in FIG. 1 in a film back attaching state.

This film back exchangeable camera 10 is featured in that a flat plate-shaped eaves portion (backward protrusion) 26, which protrudes backward from the film back attaching surface 20a, is provided to the top portion of the camera body 20. The backward protruding amount of this eaves portion 26 and the lateral width thereof correspond respectively to the top surface size of the film back 30. Accordingly, in a state where the film back 30 is attached to the camera body 20, as shown in FIG. 2, the top surface of the film back 30 is covered with the eaves portion 26. The finder block 24 extending backward of the camera is in a state where it is placed on the eaves portion 26.

In this embodiment, regarding the grip portion 21 of the camera body 20, also, its rear portion protrudes backward of the camera from the position of the film back attaching surface 20a. Therefore, when the film back 30 is attached to the camera body 20, the backward-protruding portion of the grip portion 21 covers one side surface of the film back 30. An ISO dial 34 is provided on a side surface of the filmback 30 opposite from the side surface thereof covered with the grip portion 21.

An operational 27 and an operation dial 28 are respectively provided on the left side and the right side of the eaves portion 26 with the finder block 24 interposed therebetween. Each of these operation dials 27, 28 constitutes an operation member for operating function installed in the camera body 20. For example, the operation dial 27 is an exposure compensating dial, and the operation dial 28 is a shutter speed setting dial. When each of the dials 27 and 28 is rotated, a code plate or a switch member in the eaves portion 26 is operated, so that a signal corresponding to the rotational position of the dial is input to a control circuit 29 within the camera body 20. The control circuit 29 causes a corresponding section to execute a predetermined operation according to its input signal. Namely, when the operation dial 27 functioning as the exposure compensating dial is rotated in forward or reverse direction, exposure is adjusted stepwise in a plus direction or in a minus direction. When the operation dial 28 functioning as the shutter speed setting is rotated, the running distance between a front curtain and a rear curtain that constitute the focal-plane shutter 25 changes according to its rotational position, so that the film exposing time is adjusted.

Figure 3:
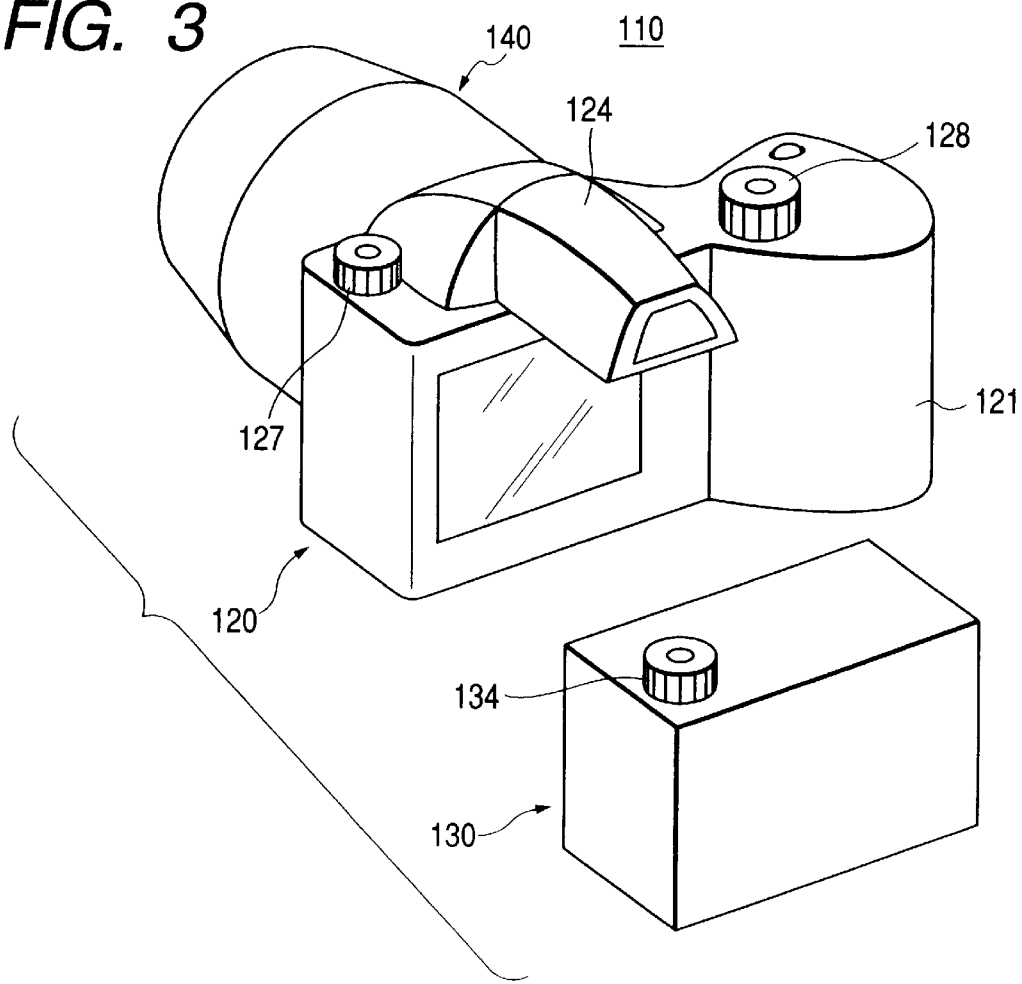
FIG. 3 is an external perspective view showing an example of a related film back exchangeable camera.

As clear from comparison with the example shown in FIG. 3, in the present embodiment, the operation dials 27 and 28 are provided on the eaves portion 26 protruding backward of the camera from the film back attaching surface 20a. Therefore, the operation dials 27 and 28, provided on the camera body 20, not on the film back 30, are located near the rear end of the camera. In case that the operation members such as the operation dials 27 and 28 are located much far from the photographer, they are difficult to be operated. However, according to the arrangement in the present embodiment, the operation members are located near the rear end of the camera and near the photographer. Therefore, the operation members are easy to be operated. In other words, the substantially same operation ability can be obtained as in the case where the operation dials 27 and 28 are provided on the film back 30, without providing the dials 27 and 28 on the film back 30. Further, since the operation dials 27 and 28 are provided on the eaves portion 26, the space on the top surface of the grip portion 21 can be effectively utilized, for example, so that the liquid crystal display 23 is provided.

As described above, in the film back exchangeable camera 10 according to the present embodiment, the eaves portion 26 that is extended backward from the film back attaching surface 20a and covers the top surface of the film back 30 when the film back 30 is attached is provided to the camera body 20, and the dials 27 and 28 that are the operation members for the camera are provided on this eaves portion 26. Therefore, the superior operation ability can be obtained than in the related film back exchangeable camera.

Note that the operation member provided on the eaves portion 26 is not limited to the operation dial 27 for exposure compensation or the operation dial 28 for shutter speed setting. For example, the operation member in the form of the dial in the present embodiment may be used for the different purpose such as camera mode selection. Further, the operation member may take any form, other than the dial, such as a button, a lever and the like.

As clear from the above description, the invention can provide a film back exchangeable camera having a simple construction and a good operation ability.

What is claimed is:

1. A film back exchangeable camera having a camera body and a film back that can be attached to and detached from a rear portion of the camera body, the film back exchangeable camera comprising:
    a backward protrusion provided to the camera body, the backward protrusion protruding backward from a film back attaching surface and covering a top surface of the film back;
    at least one operation member provided on the backward protrusion; and
    a grip portion provided to the camera body, the grip portion protruding backward from the film back attaching surface together with the backward protrusion and covering one side surface of the film back.

2. The film back exchangeable camera according to claim 1, wherein the backward protrusion is formed in a shape of a flat plate.

3. The film back exchangeable camera according to claim 1, further comprising:
    a finder block placed on the backward protrusion.

4. The film back exchangeable camera according to claim 1, wherein the at least one operation member includes at least one of an exposure compensating dial and a shutter speed setting dial.

5. The film back exchangeable camera according to claim 4, wherein the exposure compensating dial and the shutter speed setting dial are located opposite from each other with respect to a finder block.

6. The film back exchangeable camera according to claim 2, further comprising:
    a finder block placed on the backward protrusion.

7. A film back exchangeable camera having a camera body and a film back that can be attached to and detached from a rear portion of the camera body, the film back exchangeable camera comprising:
- a backward protrusion provided to the camera body, the backward protrusion protruding backward from a film back attaching surface and covering a top surface of the film back; and
- at least one operation member provided on the backward protrusion including at least one of an exposure compensating dial and a shutter speed setting dial.

8. The film back exchangeable camera according to claim 7, wherein the exposure compensating dial and the shutter speed setting dial are located opposite each other with respect to a finder block.

9. The film back exchangeable camera according to claim 7, wherein the backward protrusion is formed in a shape of a flat plate.

10. The film back exchangeable camera according to claim 9, further comprising:
- a finder block on the backward protrusion.

11. The film back exchangeable camera according to claim 7, further comprising:
- a finder block on the backward protrusion.

12. The film back exchangeable camera according to claim 7, further comprising:
- a grip portion covering one side surface of the film back.

* * * * *